United States Patent
Yan (10) Patent No.: US 11,741,690 B2
(45) Date of Patent: Aug. 29, 2023

(54) METHOD FOR GENERATING PARKING MODEL, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventor: Yongshan Yan, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 162 days.

(21) Appl. No.: 17/247,968

(22) Filed: Jan. 4, 2021

(65) Prior Publication Data
US 2021/0380095 A1    Dec. 9, 2021

(30) Foreign Application Priority Data

Jun. 4, 2020    (CN) .......................... 202010497884.1

(51) Int. Cl.
*G06V 10/774*    (2022.01)
*G06N 20/00*    (2019.01)
(Continued)

(52) U.S. Cl.
CPC .......... *G06V 10/774* (2022.01); *G06F 18/217* (2023.01); *G06N 20/00* (2019.01);
(Continued)

(58) Field of Classification Search
CPC ............. B60W 30/06; B60W 2556/10; B60W 2552/53; B60W 2050/0075; B60W 2420/42; G06N 20/00; G06K 9/6262
See application file for complete search history.

(56) References Cited

U.S. PATENT DOCUMENTS 8,825,265 B1 *    9/2014  Ferguson ........... B62D 15/0255
                                                       701/26
10,960,876 B2 *   3/2021  Micelli .............. G01C 21/3446
(Continued)

FOREIGN PATENT DOCUMENTS

CN         104608766 A        5/2015
CN         107697065 A        2/2018
(Continued)

OTHER PUBLICATIONS

Office Action for Chinese Application No. 202010497884.1, dated Jun. 23, 2021, 6 pages.
(Continued)

*Primary Examiner* — Dale W Hilgendorf
*Assistant Examiner* — Hana Lee
(74) *Attorney, Agent, or Firm* — Lippes Mathias LLP (57) ABSTRACT

The present disclosure discloses a method for generating a parking model, an electronic device and a storage medium, and relates a field of autonomous parking technologies. The detailed implementing solution includes: obtaining multiple sample sets; constructing a parking cruise space for the target vehicle based on each sample set, and extracting a first parking trajectory corresponding to each sample set from each parking cruise space; recognizing an abnormal position on each first parking trajectory, and deleting driving data corresponding to the abnormal position from a sample set corresponding to each first parking trajectory to obtain target sample data in each sample set; and performing model training based on the target sample data in each sample set to generate a target parking model.

14 Claims, 3 Drawing Sheets

(51) Int. Cl.
  *G06F 18/21* (2023.01)
  *G06V 20/56* (2022.01)
  *B60W 30/06* (2006.01)
  *B60W 50/00* (2006.01)

(52) U.S. Cl.
  CPC ............ *G06V 20/56* (2022.01); *B60W 30/06* (2013.01); *B60W 2050/0075* (2013.01); *B60W 2420/42* (2013.01); *B60W 2552/53* (2020.02); *B60W 2556/10* (2020.02)

(56) References Cited

U.S. PATENT DOCUMENTS

| | | | |
|---|---|---|---|
| 2017/0308641 A1 | 10/2017 | Yamaura | |
| 2017/0344855 A1* | 11/2017 | Mande | G08G 1/0175 |
| 2018/0194344 A1* | 7/2018 | Wang | G05D 1/0236 |
| 2018/0204465 A1 | 7/2018 | Tong et al. | |
| 2019/0291720 A1* | 9/2019 | Xiao | G08G 1/14 |
| 2020/0001862 A1* | 1/2020 | Luo | G06V 20/58 |
| 2020/0191586 A1* | 6/2020 | Luo | G01C 21/3453 |
| 2020/0209866 A1* | 7/2020 | Yu | G05D 1/0212 |
| 2021/0162985 A1* | 6/2021 | Romero Leon | B62D 15/028 |
| 2021/0302187 A1* | 9/2021 | Nagavalli | G01C 21/3407 |

FOREIGN PATENT DOCUMENTS

| | | |
|---|---|---|
| CN | 109708654 A | 5/2019 |
| CN | 109733383 A | 5/2019 |
| CN | 110329245 A | 10/2019 |
| CN | 110348341 A | 10/2019 |
| CN | 110745136 A | 2/2020 |
| CN | 111179585 A | 5/2020 |
| JP | 2018075899 A | 5/2018 |
| JP | 2019032678 A | 2/2019 |
| JP | 2019196091 A | 11/2019 |
| JP | 2020001677 A | 1/2020 |

OTHER PUBLICATIONS

Research on path simulation and motion control for automatic parking, Apr. 2012, 68 pages; Abstract.
Extended European Search Report for Application No. 21164359.8, dated Sep. 14, 2021, 13 pages.
Model Enchancement Checklist, Dec. 31, 2017, 1 page.
Kevin Toohey et al., "Trajectory Similarity Measures", Sigspatial Special, vol. 7, Issue 1, May 20, 2015, pp. 43-50.
Office Action for Japanese Application No. 2021-093963, dated Jul. 19, 2022, 4 pages.
Office Action for Korean Application No. 10-2021-0071410, dated Oct. 19, 2022, 5 pages.

* cited by examiner

METHOD FOR GENERATING PARKING MODEL, ELECTRONIC DEVICE, AND STORAGE MEDIUM

CROSS-REFERENCE TO RELATED APPLICATION

This application is based upon and claims priority to and benefits of Chinese Patent Application Serial No. 2020104978841, filed the State Intellectual Property Office of P. R. China on Jun. 4, 2020, the entire content of which is incorporated herein by reference.

FIELD

The present disclosure relates to a field of data processing technologies and particularly to a field of autonomous parking technologies, and specifically to a method for generating a parking model, an electronic device and a storage medium.

BACKGROUND

With development of the society and improvement of a living standard of people, a requirement of people for autonomous parking is increasing. Especially in a scene having a fixed parking space, such as at home and in a company, people hope that the autonomous parking may bring convenience in the lasted kilometer.

In the related art, data collected in real time is generally utilized when a parking model is trained. That is, a high-precision map does not need to be collected in advance. Instead, road condition information collected in real time is directly taken as model training samples.

SUMMARY

According to embodiments of the present disclosure, a method for generating a parking model is provided. The method includes: obtaining a plurality of sample sets, each sample set including driving data of a target vehicle driving from a preset spot to a target parking spot; constructing a parking cruise space for the target vehicle based on each sample set, and extracting a first parking trajectory corresponding to each sample set from each parking cruise space, in which, the parking cruise space is configured to identify a virtual space in which the target vehicle drives from the preset spot to the target parking spot; recognizing an abnormal position on each first parking trajectory, and deleting driving data corresponding to the abnormal position from a sample set corresponding to each first parking trajectory to obtain target sample data in each sample set; and performing model training based on the target sample data in each sample set to generate a target parking model.

According to embodiments of the present disclosure, an electronic device is provided. The electronic device includes: at least one processor and a memory. The memory is communicatively coupled to the at least one processor. The memory is configured to store instructions executed by the at least one processor. When the instructions are executed by the at least one processor, the at least one processor is caused to implement the method for generating the parking model according to above embodiments.

According to embodiments of the present disclosure, a non-transitory computer readable storage medium is provided. The non-transitory computer readable storage medium has computer instructions stored thereon. The computer instructions are configured to enable a computer to execute the method for generating the parking model according to above embodiments.

It should be understood that, description in Summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

In the related art, data collected in real time is generally utilized when a parking model is trained. That is, a high-precision map does not need to be collected in advance. Instead, road condition information collected in real time is directly taken as model training samples. However, the data collected in real time may easily contain special road condition information and a driving trajectory, such as avoiding a temporary pedestrian and other vehicles. Therefore, abnormal data is easy to appear, leading to the failure of a control strategy subjected to learning to guarantee a safety of the autonomous parking, which affects the user experience.

Description will be made below to a method and an apparatus for generating a parking model, an electronic device and a storage medium according to embodiments of the present disclosure with reference to the accompanying drawings.

Figure 1:
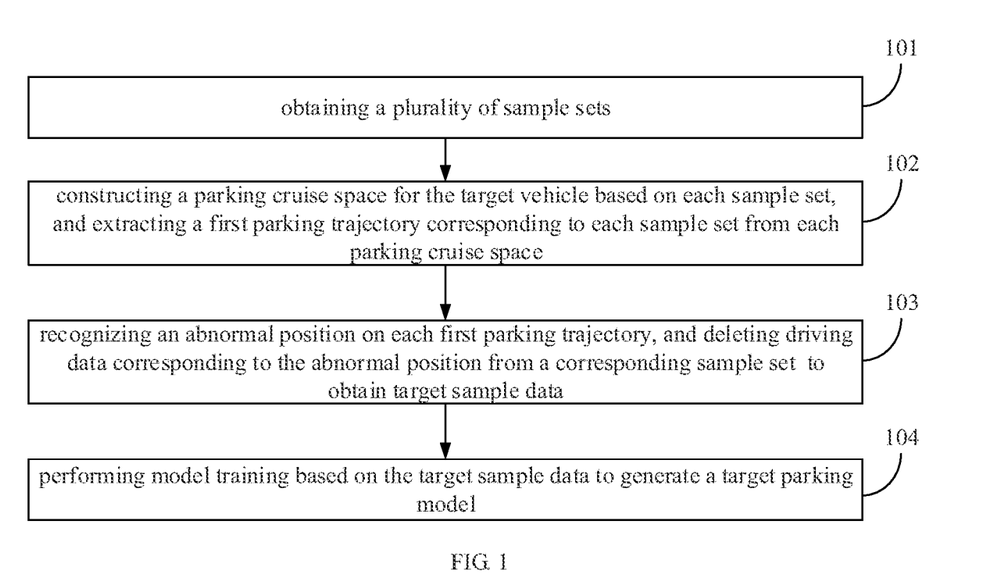
FIG. 1 is a flow chart illustrating a method for generating a parking model according to an embodiment of the present disclosure.

FIG. 1 is a flow chart illustrating a method for generating a parking model according to an embodiment of the present disclosure. It should be noted that, an execution body of the method for generating the parking model in embodiments of the present disclosure is an apparatus for generating a parking model. The apparatus for generating the parking model may be a server, software in a hardware device, or the like.

As illustrated in FIG. 1, the method for generating the parking model according to embodiments of the present disclosure includes the followings.

At block 101, multiple sample sets are obtained.

Each sample set includes driving data (also called parking driving data) of a target vehicle driving from a preset spot to a target parking spot.

It should be noted that, for a same position, that is, for same preset spot and same target parking spot, there may be multiple sample sets for generating the parking model. It should be understood that, when single sample data is employed for training a model, the trained model only contains driving data in the single sample data, which makes the autonomous parking only based on the driving data in the single sample data when the trained model is used for the autonomous parking. A purpose of autonomous parking of the target vehicle with multiple attitudes may not be achieved. Therefore, multiple sample sets may be obtained as initial data to meet a requirement of sample diversity, such that a well autonomous parking strategy may be obtained by using the parking model obtained by training with the multiple sample sets when the target vehicle is in multiple attitudes.

In some embodiments, a redundancy may be set for the number of the sample sets. For example, when the number of the sample sets used for modeling is N, N+5 sample sets may be obtained. That is, the redundancy which is 5 sample sets is added to further ensure that the number of the obtained sample sets meets a training requirement.

The preset spot may be a start point for parking the target vehicle, such as an entrance of a parking lot, and a fixed position on a driving lane in a garage. The target parking spot may be a parking spot frequently used by a user. When the number of parking times that the user uses a parking spot meets a preset parking times, the parking spot may be taken as the target parking spot. The preset parking times may be the same as the above sample data. That is, the parking spot whose number of parking times meets a sample requirement may be taken as the target parking spot.

The driving data may include one or more of image data around the target vehicle, trajectory data generated by the vehicle driving, control data generated by the user controlling the target vehicle to drive, and attitude data generated after the vehicle is controlled.

It should be understood that, the present disclosure is applied to constructing an autonomous parking model for a relatively fixed parking spot, i.e., a parking spot frequently used by the user. Therefore, data of the preset spot and the target parking spot usually used by the user may be repeatedly obtained during daily driving. Driving data of the target vehicle driven by the user is collected continuously when the vehicle is driven by the user from the preset spot to the target parking spot. The driving data of the target vehicle driven by the user from the preset spot to the target parking spot is one sample set.

When the sample set is obtained, by identifying a position of the target vehicle, collection of the sample set is started when the target vehicle drives from a non-target parking spot to the preset spot. Alternatively, collection for the sample set may be started based on a start instruction of the user. It should be understood that, a frequency for collecting the sample set may be set based on a driving requirement of the user, which is not limited in the present disclosure.

At block 102, a parking cruise space is constructed for the target vehicle based on each sample set, and a first parking trajectory corresponding to each sample set is extracted from each parking cruise space.

The parking cruise space is configured to identify a virtual space in which the target vehicle drives from the preset spot to the target parking spot.

In some embodiments, each sample set may be modeled, such as by using a three-dimensional modeling method, to construct spatial information from the preset spot to the target parking spot. The parking cruise space may include, but be not limited to, a parking sign, a driving sign, a speed bump sign, a lane marking, and a fixed obstacle (such as a cement pillar in the parking lot). In other words, the parking cruise space of the target vehicle constructed based on the sample set is a virtual space the same or similar to an actual space, and configured to project a current first parking trajectory.

Further, the first parking trajectory may be a parking driving trajectory of the target vehicle driving from the preset spot to the target parking spot. A moving trajectory of any point on the target vehicle may be selected as the first parking trajectory, such as, a trajectory generated by a moving coordinate of a center position of a body of the target vehicle, or a travel trajectory of any tire of the target vehicle.

It should be understood that, as the target vehicle drives from the preset spot to the target parking spot in one parking process, each sample set includes one first parking trajectory corresponding to the parking process.

At block 103, an abnormal position on each first parking trajectory is recognized, and driving data corresponding to the abnormal position is deleted from a corresponding sample set to obtain target sample data.

It should be noted that, an unexpected situation is generally encountered during parking, such as avoiding a pedestrian and other vehicles. In this case, a trajectory position obviously unrelated to a parking action may appear on the first parking trajectory. These avoiding processes are unrelated to a conventional parking trajectory, and are not suitable as reference data for the autonomous parking. Therefore, the trajectory position unrelated to the parking trajectory needs to be deleted, and remaining trajectory data, i.e., trajectory data really used for parking may be taken as the target sample data for constructing the parking model.

It should be understood that, the special road condition of avoiding the pedestrian and other vehicles is not a normal event during parking, and a time point and a position of each special road condition are unpredictable. Therefore, in the present disclosure, the data corresponding to the abnormal position needs to be deleted when the target sample data is selected for constructing the parking model, and the special road condition may be avoided based on an avoidance strategy in an autonomous parking program during the autonomous parking.

At block 104, model training is performed based on the target sample data to generate a target parking model.

In some embodiments, a deep learning model is employed to perform training on the parking model and the target sample data.

The target parking model is configured to provide vehicle control data from the preset spot to the target parking spot, such that the target vehicle may automatically park based on the vehicle control data provided by the target parking model when arriving at the preset spot.

Therefore, with the method for generating the parking model of the present disclosure, a problem of using inaccurate data when constructing the parking model is solved, noise reduction is effectively performed on the parking data for constructing the target parking model, thereby improving accuracy and reliability of the constructed parking model. The parking control strategy obtained by the parking model obtained based on the method for generating a parking model provided by the present disclosure is safer and more reliable.

Description will be made below to a method for generating a parking model according to another embodiment of the present disclosure with reference to FIG. 2.

Figure 2:
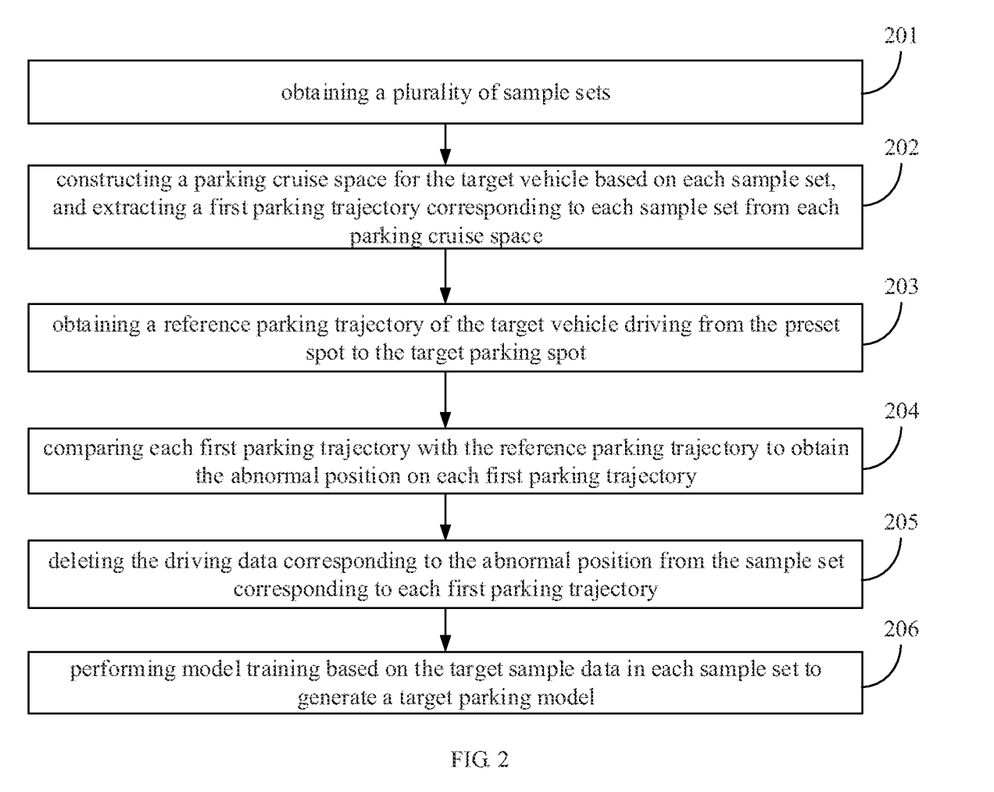
FIG. 2 is a flow chart illustrating a method for generating a parking model according to another embodiment of the present disclosure.

As illustrated in FIG. 2, on the basis of the embodiment illustrated in FIG. 1, the method for generating the parking model in embodiments of the present disclosure includes the followings.

At block 201, multiple sample sets are obtained.

It should be noted that, since the target parking spot in embodiments of the present disclosure is a fixed parking spot, multiple sample sets are easily generated. However, some sample sets are not suitable as a sample set for constructing a parking model due to a large time span or carrying error data. Therefore, multiple candidate sample sets collected by a target vehicle may be selected to obtain multiple suitable sample sets.

It should be understood that, when the multiple candidate sample sets are selected, the number of selected multiple sample sets may exceed a number actually required. For example, the number of selected multiple sample sets may be 5 greater than or equal to the number actually required to ensure the redundancy for screening parking trajectories.

As a possible implementation, multiple candidate sample sets and a generation time point of each candidate sample set are obtained, and the multiple sample sets are selected from the multiple candidate sample sets based on the generation time point of each candidate sample set.

In other words, the candidate sample sets may be screened based on the generation time point of each candidate sample set. For example, there is a candidate sample set generated too early, such as a candidate sample set with data generated six months ago. In this case, the candidate sample set is too old. A parking level of the driver may change greatly with time. Therefore, it is determined that the candidate sample set is not suitable to be selected as the sample set.

In some embodiments of the present disclosure, the multiple sample sets may be selected from the multiple candidate sample sets based on a criteria that, the generation time point is within 6 months, with at least two candidate sample sets generated in one month, and the number of candidate sample sets generated in one day may not exceed two.

As another possible implementation, multiple candidate sample sets are obtained, and the number of images in each candidate sample set are obtained. A first candidate sample set with a difference value between the number of images and a reference number greater than or equal to a first preset value is determined, and the first candidate sample set is deleted from the multiple candidate sample sets to obtain the multiple sample sets.

In other words, in order to ensure that the sample set for constructing the parking model is complete, the number of images in the candidate sample set needs to be selected. In detail, the multiple candidate sample sets are obtained. The number of images in each candidate sample set are also obtained. The difference value between the number of images in each candidate sample set and the reference number is obtained. The reference number may be a reasonable range of the conventional number of images obtained during one parking driving. When a difference value between the number of images in any candidate sample set and the reference number is greater than or equal to the first preset value, it indicates that a large amount of non-parking operations are performed during a parking process corresponding to the candidate sample set, or not all images during the whole parking process are collected due to a fault of a vehicle camera. Therefore, the candidate sample set needs to be deleted from the multiple candidate sample sets.

The reference number may be calculated based on a distance from the preset spot to the target parking spot, or may be obtained based on driving data of a large amount of users.

As another possible implementation, multiple candidate sample sets are obtained, and the number of reversing times of the target vehicle while the target vehicle drives from the preset point to the target parking point is obtained based on each candidate sample set. A second candidate sample set with a difference value between the number of reversing times and a reference value greater than or equal to a second preset value is obtained, and the second candidate sample set is deleted from the multiple candidate sample sets to obtain the multiple sample sets.

It should be understood that, when the target vehicle has a large amount of reversing actions in the parking process, it means that parking actions of the current driver is unskilled. Taking parking data of the current driver as a sample set for training may seriously affect an effect of the autonomous parking after the training. Therefore, the sample set with many reversing times may be deleted.

In detail, the multiple candidate sample sets are obtained. In each candidate sample set, the number of reversing times of the target vehicle while the target vehicle drives from the preset point to the target parking point is obtained. The difference value between the number of reversing times and the reference value is obtained. The reference value may be set to 1 or 2, that is, the fewer number of adjustments is performed in the parking process due to different vehicle body attitudes. When a second candidate sample set is recognized to have the difference value between the number of reversing times and the reference value is greater than or equal to the second preset value, the second candidate sample set is deleted from the multiple candidate sample sets to obtain the multiple sample sets.

In this way, with the method for generating parking model according to embodiments of the present disclosure, a data quality of the sample set for constructing the parking model is improved by screening the candidate sample sets, and the noise reduction effect is improved from the initial sample data.

It should be understood that, one or more of the above ways for selecting the sample set may be used simultaneously. In this way, a suitable number of sample sets may be selected when there are a large amount of sample sets, which effectively improves the efficiency of subsequent modeling.

At block 202, a parking cruise space is constructed for the target vehicle based on each sample set, and a first parking trajectory corresponding to each sample set is extracted from each parking cruise space.

It should be noted that, description for the action at block 202 may be referred to the relevant description at block 102, which may not be elaborated here.

At block 203, a reference parking trajectory of the target vehicle driving from the preset spot to the target parking spot is obtained.

It should be noted that, the reference parking trajectory may be a travel trajectory usually used by the target vehicle. For example, when the target parking spot is located at a position diagonally opposite to the entrance of the parking lot, the driver may generally go straight and then turn to reach the target parking spot, or may generally turn and then go straight to reach the target parking spot. Alternatively, the reference parking trajectory may be planned manually by the user.

In other words, different ways for obtaining the reference parking trajectory may be employed based on different natures of the reference parking trajectory.

When the reference parking trajectory is a driving trajectory commonly used by the target vehicle, the reference parking trajectory may be selected from the first parking trajectories in the collected sample sets. Further, it may be determined whether a first parking trajectory is a driving trajectory frequently used by determining a similarity between the first parking trajectories. That is, when a first parking trajectory is similar to parking trajectories other than the first parking trajectory, it means that a route traveled by the target vehicle in this parking process is the same as a route traveled in other parking processes. When a first parking trajectory is different from the parking trajectories other than the first parking trajectory, it means that the route traveled by the target vehicle in this parking process is different from the routes traveled in other parking processes.

Therefore, as a possible implementation, a similarity between each two first parking trajectories is obtained, and a parking trajectory is selected from the extracted first parking trajectories as the reference parking trajectory based on the similarity.

In detail, the first parking trajectories corresponding to the multiple sample sets may be ranked based on a certain order, and successively selected as a candidate parking trajectory. Then the candidate parking trajectory is successively compared with first parking trajectories corresponding to sample sets other than a current sample set corresponding to the candidate parking trajectory to obtain multiple similarities between the candidate parking trajectory and other first parking trajectories. The multiple similarities corresponding to each candidate parking trajectory are added and then averaged to obtain a similarity average value. A candidate parking trajectory with a maximum similarity average value is taken as the reference parking trajectory. Therefore, the reference parking trajectory obtained based on the similarity of the first parking trajectories may be in line with the actual driving habits of the user.

For example, when the number of sample sets is five, first parking trajectories corresponding to the five sample sets may he obtained respectively, i.e., a first parking trajectory corresponding to the first sample set, a first parking trajectory corresponding to the second sample set, a first parking trajectory corresponding to the third sample set, a first parking trajectory corresponding to the fourth sample set, and a first parking trajectory corresponding to the fifth sample set. Then a similarity between the first parking trajectory corresponding to the first sample set and the first parking trajectory corresponding to the second sample set, a similarity between the first parking trajectory corresponding to the first sample set and the first parking trajectory corresponding to the third sample set, a similarity between the first parking trajectory corresponding to the first sample set and the first parking trajectory corresponding to the fourth sample set, and a fourth similarity between the first parking trajectory corresponding to the first sample set and the first parking trajectory corresponding to the fifth sample set are calculated to obtain four similarities. The four similarities are added and averaged to obtain a similarity average value corresponding to the first parking trajectory corresponding to the first sample set. Similarly, a similarity average value corresponding to the first parking trajectory corresponding to the second sample set, a similarity average value corresponding to the first parking trajectory corresponding to the third sample set, a similarity average value corresponding to the first parking trajectory corresponding to the fourth sample set, and a similarity average value corresponding to the first parking trajectory corresponding to the fifth sample set are successively obtained. The five similarity average values are compared with each other, and a first parking trajectory with a maximum average value is taken as the reference parking trajectory.

For another example, after the multiple similarities between each candidate parking trajectory and the other first parking trajectories are obtained, the multiple similarities may be respectively compared with a preset similarity threshold. When a similarity between the candidate parking trajectory and a first parking trajectory is greater than the preset similarity threshold, the number of recording times is increased by one. Then, the number of recording times corresponding to each candidate parking trajectory is obtained. A candidate parking trajectory with a maximum number of recording times is taken as the reference parking trajectory.

The reference parking trajectory may be manually planned by the user. In detail, the reference parking trajectory may be selected by the user from the first parking trajectories corresponding to the collected sample sets, or the reference parking trajectory may be additionally planned by the user based on an actual parking cruise space.

In another possible embodiment, each parking cruise space and each first parking trajectory are displayed, a parking trajectory selection operation is monitored, and a first parking trajectory selected by the parking trajectory selection operation is determined as the reference parking trajectory.

In other words, after the parking cruise space is constructed for the target vehicle based on each sample set and the first parking trajectory corresponding to each sample set is extracted, the parking cruise space constructed based on each sample set and the first parking trajectory corresponding to each sample set may be displayed to the user, such that the user may determine a suitable first parking trajectory as the reference parking trajectory by viewing the display, and a. selection operation is performed on the first parking trajectory suitable as the reference parking trajectory. The selection operation of the user for the suitable first parking trajectory is monitored. The first parking trajectory selected by the monitored selection operation is determined, and taken as the reference parking trajectory. In this way, the reference parking trajectory selected by the user is in line with preference of the user, and the target parking model generated by performing subsequent operations based on the reference parking trajectory selected by the user is in line with the preference of the user.

In another possible embodiment, design data or map data of a parking region to which the target parking spot belongs is obtained, and a parking trajectory is planned for the target vehicle as the reference parking trajectory based on the design data or map data, the preset spot and the target parking spot.

The design data and/or the map data may be data marked with driving marking information and a size of each position between the preset spot and the target parking spot based on a design drawing used to construct the parking lot.

In other words, the design data and/or the map data of the parking region to which the target parking spot belongs may be obtained via a corresponding authority or the network. A suitable parking trajectory from the preset spot to the target parking spot is planned based on the design data or the map data, and taken as the reference parking trajectory. The suitable parking trajectory may meet a condition such as having the shortest route and the least obstacles.

Therefore, the parking trajectory manually planned by the user may enable the reference parking trajectory more scientific.

At block 204, each first parking trajectory is compared with the reference parking trajectory to obtain the abnormal position on each first parking trajectory.

It should be understood that, the abnormal position may be a position where the first parking trajectory is different from the reference parking trajectory. In detail, the reference parking trajectory is a standard parking trajectory that is optimal or most consistent with the preference of the user when there is no abnormal condition, therefore, each first parking trajectory is compared with the reference parking trajectory. When the first parking trajectory is the same as or has a deviation within an allowable error range with the reference parking trajectory at a position, the position is determined to be a normal position. When the first parking trajectory deviates greatly from the reference parking trajectory at a position, that is, a deviation between the first parking trajectory and the reference parking trajectory at the position exceeds the allowable error range, the position is determined as the abnormal position. Based on the same principle, the abnormal position on each first parking trajectory may be obtained by comparing each first parking trajectory with the reference parking trajectory.

At block 205, the driving data corresponding to the abnormal position is deleted from the sample set corresponding to each first parking trajectory.

At block 206, model training is performed based on the target sample data to generate a target parking model.

The reference parking trajectory may be obtained firstly. Each first parking trajectory may be compared with the reference parking trajectory to recognize, the abnormal position. And then, the abnormal position is deleted. In this way, the noise of the parking data for constructing the target parking model may be effectively reduced. Thus, a parking model with an accurate result and a high reliability may be constructed. The parking control strategy obtained by the parking model obtained based on the method for generating the parking model provided by the present disclosure is safer and more reliable.

It should be noted that, after each first parking trajectory is compared with the reference parking trajectory to obtain the abnormal position on each first parking trajectory at block 204, there may be a situation that the abnormal positions in multiple first parking trajectories are all at a same position. In other words, positions on multiple first parking trajectories corresponding to a IS certain position on the reference parking trajectory may be an abnormal position, and corresponding driving data may be deleted. However, when all the driving data of the positions determined as the abnormal position in the multiple first parking trajectories is deleted, the corresponding position on the reference parking trajectory may have no driving data available for training. That is, sample data used for subsequent training has space missing. Furthermore, a condition that a trained model is prone to incomplete control strategies may be caused. That is, a control strategy of a region corresponding to the space missing of the sample data may also have missing accordingly. Therefore, the driving data at the abnormal position may be filtered to ensure a spatial continuity of the training data.

Figure 3:
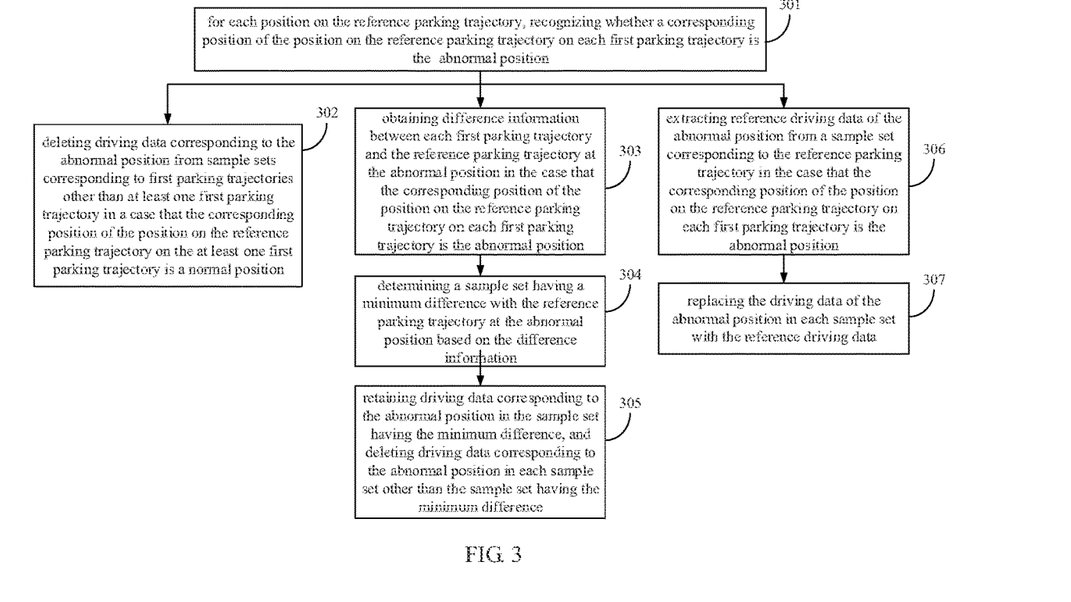
FIG. 3 is a flow chart illustrating a method for generating a parking model according to another embodiment of the present disclosure.

As a possible embodiment, as illustrated in FIG. 3, the method for generating the parking model according to embodiments of the present disclosure may also include the followings.

At block 301, for each position on the reference parking trajectory, it is recognized whether a corresponding position of the position on the reference parking trajectory on each first parking trajectory is the abnormal position.

In other words, for each position on the reference parking trajectory, the position may be sequentially compared with driving data of each position on each first parking trajectory. When a certain position on a first parking trajectory is determined as the abnormal position, it is further determined whether the certain position on other first parking trajectories are also the abnormal position.

For example, five sample sets are collected, and there are five first trajectories corresponding to the five sample sets. Firstly, a first parking trajectory corresponding to the first sample set is compared with the reference parking trajectory to obtain an abnormal position on the first parking trajectory, and a coordinate position of the abnormal position is obtained. Then it is determined whether the coordinate position on a first parking trajectory corresponding to the second sample set is an abnormal position, whether the coordinate position on a first parking trajectory corresponding to the third sample set is an abnormal position, whether the coordinate position on a first parking trajectory corresponding to the fourth sample set is an abnormal position, and whether the coordinate position on a first parking trajectory corresponding to the fifth sample set is an abnormal position. When it is determined that the coordinate position is an abnormal position on all of the first parking trajectory corresponding to the second sample set, the first parking trajectory corresponding to the third sample set, the first parking trajectory corresponding to the fourth sample set and the first parking trajectory corresponding to the fifth sample set, it is determined that there is an abnormal position on all of the multiple first parking trajectories corresponding to the position (corresponding to the coordinate position) on the reference parking trajectory. When the corresponding position of the position on the reference parking trajectory on at least one first parking trajectory is not determined as the abnormal position, it is determined that there is a normal position corresponding to the position on the reference parking trajectory.

When there is a normal position corresponding to the position on the reference parking trajectory on the at least one first parking trajectory, the action at block 302 is performed.

At block 302, driving data corresponding to the abnormal position is deleted from sample sets corresponding to first parking trajectories other than the at least one first parking trajectory in a case that the corresponding position of the position on the reference parking trajectory on the at least one first parking trajectory is the normal position.

In other words, when there is at least one first parking trajectory having a normal position corresponding to the position on the reference parking trajectory, driving data corresponding to the abnormal positions on the first parking trajectories other than the at least one first parking trajectory may be deleted. That is, the driving data corresponding to the abnormal position is deleted from the sample sets corresponding to the first parking trajectories other than the at least one first parking trajectory.

For example, for the above-mentioned five first parking trajectories, for a certain position on the reference parking trajectory, when positions corresponding the certain position on all of the first parking trajectory corresponding to the first sample set, the first parking trajectory corresponding to the second sample set, the first parking trajectory corresponding to the third sample set, and the first parking trajectory corresponding to the fourth sample set are the abnormal position, and merely a position corresponding to the certain position on the first parking trajector corresponding to the fifth sample set is a normal position, the driving data corresponding to the abnormal position on the first parking trajectory corresponding to the first sample set, the driving data corresponding to the abnormal position on the first parking trajectory corresponding to the second sample set, the driving data corresponding to the abnormal position on the third sample set, and the driving data corresponding to the abnormal position on the first parking trajectory corresponding to the fourth sample set may be deleted. That is, only the driving data corresponding to the normal position on the first parking trajectory corresponding to the fifth sample set is retained.

When the corresponding position of the position on the reference parking trajectory on each first parking trajectory is determined as the abnormal position, as a possible embodiment, the action at blocks 303-305 may be performed.

At block 303, difference information between each first parking trajectory and the reference parking trajectory at the abnormal position is obtained in the case that the corresponding position of the position on the reference parking trajectory on each first parking trajectory is the abnormal position.

At block 304, a sample set having a minimum difference with the reference parking trajectory at the abnormal position is determined based on the difference information.

At block 305, driving data corresponding to the abnormal position in the sample set having the minimum difference is retained, and driving data corresponding to the abnormal position in each sample set other than the sample set having the minimum difference is deleted.

In other words, the difference information between each first parking trajectory and the reference parking trajectory at the abnormal position is further obtained when the corresponding position of the certain position on the reference parking trajectory on each first parking trajectory is the abnormal position. The difference information may be a horizontal distance between a first parking trajectory and the reference parking trajectory. Then the obtained multiple horizontal distances may be compared with each other to obtain difference information having a minimum horizontal distance, and a sample set corresponding to the difference information having the minimum horizontal distance is further determined. Driving data corresponding to the abnormal position in the sample set having the minimum difference is retained, and the driving data corresponding to the abnormal positions in other sample sets is deleted.

It should be understood that, when there are multiple sample sets having the minimum difference, any one of the multiple sample sets may be randomly selected for retaining, or a sample set with the least number of abnormal positions may be selected for retaining.

When the corresponding position of the position on the reference parking trajectory on each first parking trajectory is determined as the abnormal position, as another possible embodiment, the action at blocks 306-307 may be performed.

At block 306, reference driving data of the abnormal position is extracted from a sample set corresponding to the reference parking trajectory in the case that the corresponding position of the position on the reference parking trajectory on each first parking trajectory is the abnormal position.

At block 307, the driving data of the abnormal position in each sample set is replaced with the reference driving data.

In other words, when it is recognized that a corresponding position of a certain position on the reference parking trajectory on each first parking trajectory is the abnormal position, the driving data corresponding to the abnormal position on each first parking trajectory is deleted. In this case, there is no driving data obtained by collection at the abnormal position. And then, the reference driving data on the reference parking trajectory is used as the driving data corresponding to the abnormal position in the sample set corresponding to each first parking trajectory.

In this way, with the method for generating the parking model according to embodiments of the present disclosure, the driving data on each first trajectory may be selectively deleted or replaced based on a condition of the abnormal position, such that the data for performing model training has consistency, thus improving the accuracy of the trained parking model.

Figure 4:
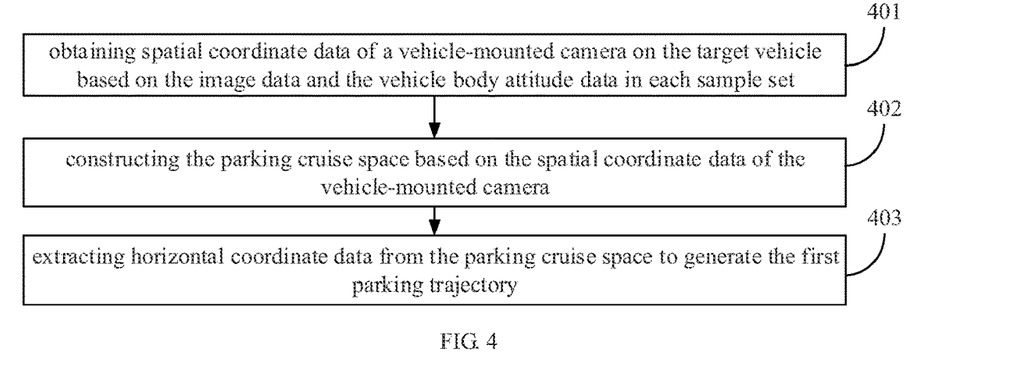
FIG. 4 is a flow chart illustrating a method for generating a parking model according to another embodiment of the present disclosure.

FIG. 4 is a flow chart illustrating a method for generating a parking model according to another embodiment of the present disclosure. In the method for generating the parking model according to embodiments of the present disclosure, the driving data includes image data and vehicle body attitude data. Constructing the parking cruise space for the target vehicle based on each sample set and extracting the first parking trajectory corresponding to each sample set from each parking cruise space at block 102 or 202 may include the followings as illustrated in FIG. 4.

At block 401, spatial coordinate data of a vehicle-mounted camera on the target vehicle is obtained based on the image data and the vehicle body attitude data in each sample set.

The vehicle-mounted camera is an image capturing device with a function of performing image collection at interval or continuously. In some embodiments, the target vehicle may be configured with at least one vehicle-mounted camera. When the vehicle-mounted camera has a 360-degree panoramic lens, one vehicle-mounted camera may be configured on the top of the target vehicle, or one or more vehicle-mounted cameras may be configured around the target vehicle.

In detail, in embodiments of the present disclosure, for example, the preset spot or the target parking spot may be selected as an origin to construct a world coordinate system, and the spatial coordinate data of the vehicle-mounted camera is obtained. The spatial coordinate data of the vehicle-mounted camera may be changed continuously with the moving of the target vehicle. That is, a driving trajectory of the target vehicle may be obtained through the spatial coordinate data of the vehicle-mounted camera.

It should be understood that, a visual image has multiple characteristics related to a position of capturing the visual image, such as foreshortening effects. Therefore, for a same target, the image data captured by the vehicle-mounted cameras at different positions are also different. In addition, the vehicle body attitude data may at least include steering information and acceleration information of the target vehicle. That is, images taken by the same vehicle-mounted camera at different vehicle body attitudes or different accelerations may also be different. Therefore, image information in the image data may be corrected based on the spatial coordinate data of the vehicle-mounted camera and the vehicle body attitude data.

At block 402, the parking cruise space is constructed based on the spatial coordinate data of the vehicle-mounted camera.

In other words, while the target vehicle drives, an attitude and a position of the vehicle-mounted camera may be gradually changed with the motion of the target vehicle, and the image data captured by the vehicle-mounted camera may gradually increase. The parking cruise space of the target vehicle may be obtained by stitching the image data in the world coordinate system.

At block 403, horizontal coordinate data is extracted from the parking cruise space to generate the first parking trajectory.

The horizontal coordinate data may be extracted based on the spatial coordinate data of any vehicle-mounted camera. That is, a trajectory of horizontal coordinates of the vehicle-mounted camera may be taken as the first parking trajectory of the target vehicle.

As a possible embodiment, spatial coordinates of the vehicle-mounted camera are employed to construct the parking cruise space, and the image data may also include image information, such as a driving marker and a parking marker, set between the preset spot and the target parking spot. Therefore, when the driving data of the abnormal position is deleted from the sample set, merely the vehicle body attitude data corresponding to the abnormal position may be deleted from the sample set and the image data is retained, such that the information for constructing the parking cruise space is as complete as possible, Further, as a possible embodiment, after the target parking model is generated by utilizing the target sample data to train the parking model, a driving state of the target vehicle may be monitored. When the target vehicle is located at any position between the preset spot and the target parking spot, vehicle body attitude data of the target vehicle may be collected and be inputted to the target parking model. Thus, a control strategy for controlling the target vehicle to perform autonomous parking is obtained based on the target parking model, such that the target vehicle may be parked automatically from a current position to the target parking spot. Further, the image data and the vehicle body attitude data of the target vehicle controlled by the control strategy outputted by the target parking model may also be collected as the latest sample data to train the parking model. It should be understood that, the control strategy outputted by the target parking model is to make the attitude of the target vehicle the same as a target attitude. In other words, a target position trajectory of the target vehicle at the next time point may be obtained through the target parking model based on the vehicle body attitude data of the target vehicle at any position between the preset spot and the target parking spot, and then a target vehicle body attitude from the current position to the target parking spot is obtained, and the control strategy for changing a current vehicle body attitude into the target vehicle body attitude is also obtained, FIG. 5 is a block diagram illustrating an apparatus for generating a parking model according to an embodiment of the present disclosure.

Figure 5:
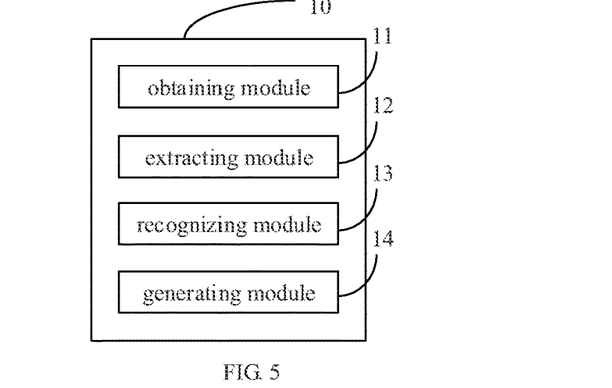
FIG. 5 is a block diagram illustrating an apparatus for generating a parking model according to an embodiment of the present disclosure.

As illustrated in FIG. 5, the apparatus 10 for generating the parking model includes: an obtaining module 11, an extracting module 12, a recognizing module 13, and a generating module 14.

The obtaining module 11 is configured to obtain multiple sample sets. Each sample set includes driving data of a target vehicle driving from a preset spot to a target parking spot.

The extracting module 12 is configured to construct a parking cruise space for the target vehicle based on each sample set, and to extract a first parking trajectory corresponding to each sample set from each parking cruise space. The parking cruise space is configured to identify a virtual space in which the target vehicle drives from the preset spot to the target parking spot.

The recognizing module 13 is configured to recognize an abnormal position on each first parking trajectory, and to delete driving data corresponding to the abnormal position from a sample set corresponding to each first parking trajectory to obtain target sample data.

The generating module 14 is configured to perform model training based on the target sample data to generate a target parking model.

Figure 7:
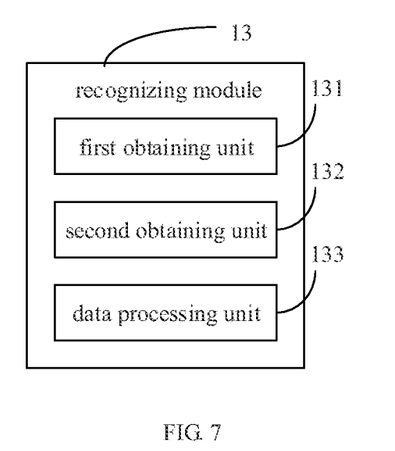
FIG. 7 is a block diagram illustrating an apparatus for generating a parking model according to another embodiment of the present disclosure.

In some embodiments, as illustrated in FIG. 7, the recognizing module 13 includes a first obtaining unit 131, a second obtaining unit 132, and a data processing unit 133.

The first obtaining unit 131 is configured to obtain a reference parking trajectory of the target vehicle driving from the preset spot to the target parking spot.

The second obtaining unit 132 is configured to compare each first parking trajectory with the reference parking trajectory to obtain the abnormal position on each first parking trajectory.

The data processing unit 133 is configured to delete the driving data corresponding to the abnormal position from the sample set corresponding to each first parking trajectory.

In some embodiments, the data processing unit 133 includes a first recognizing sub-unit and a first deleting sub-unit.

The first recognizing sub-unit is configured to, for each position on the reference parking trajectory, recognize whether a corresponding position of the position on the reference parking trajectory on each first parking trajectory is the abnormal position.

The first deleting sub-unit is configured to, in a case that the corresponding position of the position on the reference parking trajectory on at least one first parking trajectory is a normal position, delete driving data corresponding to the abnormal position from sample sets corresponding to first parking trajectories other than at least one first parking trajectory.

In some embodiments, the data processing unit 133 includes a first obtaining sub-unit, a first determining sub-unit, and a second deleting sub-unit.

The first obtaining sub-unit is configured to obtain difference information between each first parking trajectory and the reference parking trajectory at the abnormal position in the case that the corresponding position of the position on the reference parking trajectory on each first parking trajectory is the abnormal position.

The first determining sub-unit is configured to determine a sample set having a minimum difference with the reference parking trajectory at the abnormal position based on the difference information.

The second deleting sub-unit is configured to retain driving data corresponding to the abnormal position in the sample set having the minimum difference, and to delete driving data corresponding to the abnormal position in each sample set other than the sample set with the minimum difference.

In some embodiments, the data processing unit 133 includes a second obtaining sub-unit and a third deleting sub-unit.

The second obtaining sub-unit is configured to extract reference driving data of the abnormal position from a sample set corresponding to the reference parking trajectory in the case that the corresponding position of the position on the reference parking trajectory on each first parking trajectory is the abnormal position.

The third deleting sub-unit is configured to replace the driving data of the abnormal position in each sample set with the reference driving data.

In some embodiments, the first obtaining unit 131 includes a first obtaining component and a first selecting component.

The first obtaining component is configured to obtain a similarity between each two first parking trajectories.

The first selecting component is configured to select a parking trajectory from the extracted first parking trajectories as the reference parking trajectory based on the similarity.

In some embodiments, the first obtaining unit 131 includes a first display component and a second selecting component.

The first display component is configured to display each parking cruise space and each first parking trajectory.

The second selecting component is configured to monitor a parking trajectory selection operation, and to determine a first parking trajectory selected by the parking trajectory selection operation as the reference parking trajectory.

In some embodiments, the first obtaining unit 131 includes a second obtaining component and a third selecting component.

The second obtaining component is configured to obtain design data or map data of a parking region to which the target parking spot belongs.

The third selecting component is configured to plan a parking trajectory fir the target vehicle as the reference parking trajectory based on the design data or map data, the preset spot and the target parking spot.

Figure 6:
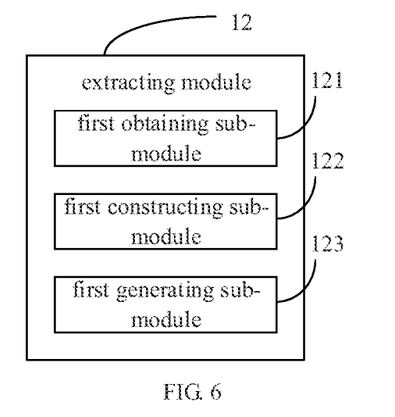
FIG. 6 is a block diagram illustrating an apparatus for generating a parking model according to another embodiment of the present disclosure.

In some embodiments, as illustrated in FIG. 6, the extracting module 12 includes a first obtaining sub-module 121, a first constructing sub-module 122, and a first generating sub-module 123.

The first obtaining sub-module 121 is configured to obtain spatial coordinate data of a vehicle-mounted camera on the target vehicle based on the image data and the vehicle body attitude data in each sample set.

The first constructing sub-module 122 is configured to construct the parking cruise space based on the spatial coordinate data of the vehicle-mounted camera.

The first generating sub-module 123 is configured to extract horizontal coordinate data from the parking cruise space to generate the first parking trajectory.

In some embodiments, the data processing unit 133 is configured to: delete vehicle body attitude data corresponding to the abnormal position from the sample set, and retain the image data.

In some embodiments, the obtaining module 11 includes a second obtaining sub-module, and a first selecting sub-module.

The second obtaining sub-module is configured to obtain multiple candidate sample sets and a generation time point of each candidate sample set.

The first selecting sub-module is configured to select the multiple sample sets from the multiple candidate sample sets based on the generation time point of each candidate sample set.

In some embodiments, the obtaining module 11 includes a third obtaining sub-module, and a second selecting sub-module.

The third obtaining sub-module is configured to obtain multiple candidate sample sets, and to obtain a number of images in each candidate sample set.

The second selecting sub-module is configured to determine a first candidate sample set with a difference value between the number of images and a reference number greater than or equal to a first preset value, and to delete the first candidate sample set from the multiple candidate sample sets to obtain the multiple sample sets.

In some embodiments, the obtaining module 11 includes a fourth obtaining sub-module, and a third selecting sub-module.

The fourth obtaining sub-module is configured to obtain a multiple candidate sample sets, and to obtain a number of reversing times of the target vehicle while the target vehicle is drives from the preset point to the target parking point based on each candidate sample set.

The third selecting sub-module is configured to obtain a second candidate sample set with a difference value between the number of reversing times and a reference value greater than or equal to a second preset value, and to delete the second candidate sample set from the multiple candidate sample sets to obtain the multiple sample sets.

With regard to the apparatus in the above embodiments, a detailed way of each module performing operations is described in detail in embodiments related to the method, which is not elaborated here.

With the apparatus for generating the parking model of the present disclosure, a problem of using inaccurate data when constructing the parking model is solved, noise reduction is effectively performed on the parking data for constructing the target parking model, thereby improving accuracy and reliability of the constructed parking model. The parking control strategy obtained by the parking model obtained based on the method for generating a parking model provided by the present disclosure is safer and more reliable.

According to embodiments of the present disclosure, the present disclosure also provides an electronic device and a readable storage medium.

Figure 8:
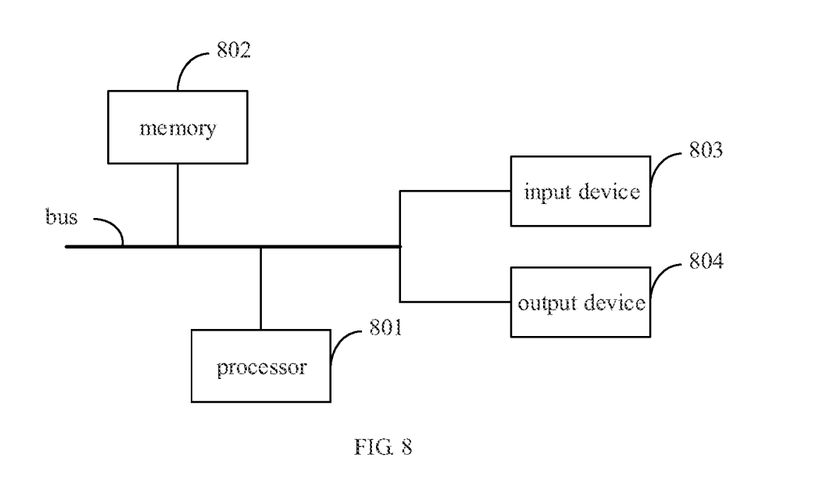
FIG. 8 is a block diagram illustrating an electronic device capable of implementing a method for generating a parking model according to embodiments of the present disclosure.

As illustrated in FIG. 8, FIG. 8 is a block diagram illustrating an electronic device capable of implementing a method for generating a parking model according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the present disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 8, a processor 801 is taken as an example.

The memory 802 is a non-transitory computer readable storage medium provided by the present disclosure. The memory is configured to store instructions executable by at least one processor, to enable the at least one processor to execute the method for generating the parking model provided by the present disclosure. The non-transitory computer readable storage medium provided by the present disclosure is configured to store computer instructions. The computer instructions are configured to enable a computer to execute the method for generating the parking model provided by the present disclosure.

As the non-transitory computer readable storage medium, the memory 802 may be configured to store non-transitory software programs, non-transitory computer executable programs and modules, such as program instructions/module (such as the obtaining module 11, the extracting module 12, the recognizing module 13, and the generating module 14 illustrated in FIG. 5) corresponding to the method for generating the parking model according to embodiments of the present disclosure. The processor 801 is configured to execute various functional applications and data processing of the server by operating non-transitory software programs, instructions and modules stored in the memory 802, that is, implements the method for generating the parking model according to the above method embodiments.

The memory 802 may include a storage program region and a storage data region. The storage program region may store an application required by an operating system and at least one function. The storage data region may store data created according to predicted usage of the electronic device based on the semantic representation. In addition, the memory 802 may include a high-speed random access memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device capable of implementing the method for generating the parking model may also include: an input device 803 and an output device 804. The processor 801, the memory 802, the input device 803, and the output device 804 may be connected via a bus or in other means. In FIG. 8, the bus is taken as an example.

The input device 803 may receive inputted digital or character information, and generate key signal input related to user setting and function control of the electronic device capable of implementing the method for generating the parking model, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PU))) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component Ouch as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to the present disclosure, a problem of using inaccurate data when constructing the parking model is solved, noise reduction is effectively performed on the parking data for constructing the target parking model, thereby improving accuracy and reliability of the constructed parking model. The parking control strategy obtained by the parking model obtained based on the method for generating a parking model provided by the present disclosure is safer and more reliable.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of disclosure.

What is claimed is:

1. A method for generating a parking model, comprising:
   obtaining a plurality of sample sets, each sample set comprising driving data of a target vehicle driving from a preset spot to a target parking spot;
   constructing a parking cruise space for the target vehicle based on each sample set, and extracting a first parking trajectory corresponding to each sample set from each parking cruise space, wherein the parking cruise space is configured to identify a virtual space in which the target vehicle drives from the preset spot to the target parking spot;
   obtaining a reference parking trajectory of the target vehicle driving from the preset spot to the target parking spot;
   recognizing whether a position on each first parking trajectory corresponding to any position on the reference parking trajectory is an abnormal position;
   in response to the position on each first parking trajectory corresponding to any position on the reference parking trajectory being the abnormal position, obtaining difference information between each first parking trajectory and the reference parking trajectory at the abnormal position;
   determining a target sample set of a target first parking trajectory having a minimum difference with the reference parking trajectory at the abnormal position based on the difference information;
   retaining driving data corresponding to the abnormal position in the target sample set, and deleting driving data corresponding to the abnormal position from sample sets of remaining first parking trajectories other than the target first parking trajectory to obtain target sample data; and
   performing model training based on the target sample data to generate a target parking model;
   wherein obtaining the reference parking trajectory of the target vehicle driving from the preset spot to the target parking spot comprises:
   taking each of the first parking trajectories as a candidate parking trajectory, calculating an average value of similarities between the candidate parking trajectory and the remaining first parking trajectories; and
   selecting the candidate parking trajectory with a maximum average value of similarities as the reference parking trajectory.

2. The method of claim 1, further comprising:
   in response to a position on at least one first parking trajectory corresponding to any position on the reference parking trajectory being a normal position, deleting driving data corresponding to the abnormal position from sample sets of first parking trajectories other than the at least one first parking trajectory.

3. The method of claim 2, further comprising:
   in response to the position on each first parking trajectory corresponding to any position on the reference parking trajectory being the abnormal position, extracting reference driving data of the abnormal position from a sample set corresponding to the reference parking trajectory; and
   replacing the driving data of the abnormal position in each sample set with the reference driving data.

4. The method of claim 1, wherein obtaining the reference parking trajectory of the target vehicle driving from the preset spot to the target parking spot further comprises:
   displaying each parking cruise space and each first parking trajectory;
   monitoring a parking trajectory selection operation, and determining a first parking trajectory selected by the parking trajectory selection operation as the reference parking trajectory.

5. The method of claim 1, wherein obtaining the reference parking trajectory of the target vehicle driving from the preset spot to the target parking spot further comprises:
   obtaining design data or map data of a parking region to which the target parking spot belongs; and
   planning a parking trajectory for the target vehicle as the reference parking trajectory based on the design data or map data, the preset spot and the target parking spot.

6. The method of claim 1, wherein the driving data comprises image data and vehicle body attitude data, and constructing the parking cruise space for the target vehicle based on each sample set and extracting the first parking trajectory corresponding to each sample set from each parking cruise space comprises:
   obtaining spatial coordinate data of a vehicle-mounted camera on the target vehicle by correcting the image data with the vehicle body attitude data in each sample set, in which the vehicle body attitude data includes steering information and acceleration information of the target vehicle;
   constructing the parking cruise space based on the spatial coordinate data of the vehicle-mounted camera; and
   extracting horizontal coordinate data from the parking cruise space to generate the first parking trajectory.

7. The method of claim 6, wherein deleting the driving data corresponding to the abnormal position from the sample set corresponding to each first parking trajectory comprises:

deleting vehicle body attitude data corresponding to the abnormal position from the sample set, and retaining the image data.

8. The method of claim 6, wherein obtaining the plurality of sample sets comprises:
obtaining a plurality of candidate sample sets, and obtaining a number of images in each candidate sample set; and
determining a first candidate sample set with a difference value between the number of images and a reference number greater than or equal to a first preset value, and deleting the first candidate sample set from the plurality of candidate sample sets to obtain the plurality of sample sets.

9. The method of claim 1, wherein obtaining the plurality of sample sets comprises:
obtaining a plurality of candidate sample sets and a generation time point of each candidate sample set; and
selecting the plurality of sample sets from the plurality of candidate sample sets based on the generation time point of each candidate sample set.

10. The method of claim 1, wherein obtaining the plurality of sample sets comprises:
obtaining a plurality of candidate sample sets, and obtaining a number of reversing times of the target vehicle while the target vehicle drives from the preset point to the target parking point based on each candidate sample set; and
obtaining a second candidate sample set with a difference value between the number of reversing times and a reference value greater than or equal to a second preset value, and deleting the second candidate sample set from the plurality of candidate sample sets to obtain the plurality of sample sets.

11. An electronic device, comprising:
at least one processor; and
a memory, communicatively coupled to the at least one processor,
wherein the memory is configured to store instructions executable by the at least one processor, and when the instructions are executed by the at least one processor, the at least one processor is caused to implement a method for generating a parking model, the method comprising:
obtaining a plurality of sample sets, each sample set comprising driving data of a target vehicle driving from a preset spot to a target parking spot;
constructing a parking cruise space for the target vehicle based on each sample set, and extracting a first parking trajectory corresponding to each sample set from each parking cruise space, wherein the parking cruise space is configured to identify a virtual space in which the target vehicle drives from the preset spot to the target parking spot;
obtaining a reference parking trajectory of the target vehicle driving from the preset spot to the target parking spot;
recognizing whether a position on each first parking trajectory corresponding to any position on the reference parking trajectory is an abnormal position;
in response to the position on each first parking trajectory corresponding to any position on the reference parking trajectory being the abnormal position, obtaining difference information between each first parking trajectory and the reference parking trajectory at the abnormal position;

determining a target sample set of a target first parking trajectory having a minimum difference with the reference parking trajectory at the abnormal position based on the difference information;
retaining driving data corresponding to the abnormal position in the target sample set, and deleting driving data corresponding to the abnormal position from sample sets of remaining first parking trajectories other than the target first parking trajectory to obtain target sample data; and
performing model training based on the target sample data to generate a target parking model;
wherein obtaining the reference parking trajectory of the target vehicle driving from the preset spot to the target parking spot comprises:
taking each of the first parking trajectories as a candidate parking trajectory, calculating an average value of similarities between the candidate parking trajectory and the remaining first parking trajectories; and
selecting the candidate parking trajectory with a maximum average value of similarities as the reference parking trajectory.

12. The electronic device of claim 11, wherein the method further comprises:
in response to a position on at least one first parking trajectory corresponding to any position on the reference parking trajectory being a normal position, deleting driving data corresponding to the abnormal position from sample sets of first parking trajectories other than the at least one first parking trajectory.

13. The electronic device of claim 12, wherein the method further comprises:
in response to the position on each first parking trajectory corresponding to any position on the reference parking trajectory being the abnormal position, extracting reference driving data of the abnormal position from a sample set corresponding to the reference parking trajectory; and
replacing the driving data of the abnormal position in each sample set with the reference driving data.

14. A non-transitory computer readable storage medium having computer instructions stored thereon, wherein the computer instructions are configured to cause a computer to implement a method for generating a parking model, the method comprising:
obtaining a plurality of sample sets, each sample set comprising driving data of a target vehicle driving from a preset spot to a target parking spot;
constructing a parking cruise space for the target vehicle based on each sample set, and extracting a first parking trajectory corresponding to each sample set from each parking cruise space, wherein the parking cruise space is configured to identify a virtual space in which the target vehicle drives from the preset spot to the target parking spot;
obtaining a reference parking trajectory of the target vehicle driving from the preset spot to the target parking spot;
recognizing whether a position on each first parking trajectory corresponding to any position on the reference parking trajectory is an abnormal position;
in response to the position on each first parking trajectory corresponding to any position on the reference parking trajectory being the abnormal position, obtaining difference information between each first parking trajectory and the reference parking trajectory at the abnormal position;

determining a target sample set of a target first parking trajectory having a minimum difference with the reference parking trajectory at the abnormal position based on the difference information;

retaining driving data corresponding to the abnormal position in the target sample set, and deleting driving data corresponding to the abnormal position from sample sets of remaining first parking trajectories other than the target first parking trajectory to obtain target sample data; and performing model training based on the target sample data to generate a target parking model;

wherein obtaining the reference parking trajectory of the target vehicle driving from the preset spot to the target parking spot comprises:

taking each of the first parking trajectories as a candidate parking trajectory, calculating an average value of similarities between the candidate parking trajectory and the remaining first parking trajectories; and selecting the candidate parking trajectory with a maximum average value of similarities as the reference parking trajectory.

* * * * *